United States Patent [19]

Arnon

[11] Patent Number: 4,545,060
[45] Date of Patent: Oct. 1, 1985

[54] DECISION FEEDBACK ADAPTIVE EQUALIZER ACTING ON ZERO STATES FOLLOWING A NON-ZERO STATE

[75] Inventor: Ephraim Arnon, Nepean, Canada

[73] Assignee: Northern Telecom Limited, Montreal, Canada

[21] Appl. No.: 537,170

[22] Filed: Sep. 29, 1983

[51] Int. Cl.⁴ .............................................. H04B 3/12
[52] U.S. Cl. ...................................... 375/14; 333/18; 375/12
[58] Field of Search ........................ 375/11, 12, 14, 15; 333/18; 364/724

[56] References Cited

U.S. PATENT DOCUMENTS 3,829,780  8/1974  White .................................... 333/18
4,270,179  5/1981  Sifford et al. ...................... 364/724

Primary Examiner—Robert L. Griffin
Assistant Examiner—Raymond C. Glenny
Attorney, Agent, or Firm—Thomas Adams

[57] ABSTRACT

In an adaptive equalizer of the decision feedback type for reducing intersymbol interference in subscriber loops of a telephone system, the corrected digital signal is applied to means for detecting the occurrence in the signal of a zero state following a non-zero state. When that occurs, a correlator samples the signal during the "zero" bit period and applies the sample to an integrator. The integrator output varies the coefficients of the feedback signal applied to the input means for addition to the incoming digital signal to provide the corrected signal. The equalizer may have several stages, each for detecting a "zero" state in a different bit period following the original pulse. Also the circuitry may be duplicated for each polarity if the input signal is bipolar.

20 Claims, 9 Drawing Figures

DECISION FEEDBACK ADAPTIVE EQUALIZER ACTING ON ZERO STATES FOLLOWING A NON-ZERO STATE

Background of the Invention

The invention relates to adaptive equalizers for digital communications and is especially, but not exclusively, applicable to adaptive equalizers of the decision feedback type for reducing intersymbol interference in subscriber loops of telephone systems.

During transmission, digital signals are attenuated and distorted by the filter characteristics of the transmission path. Usually such attenuation and distortion are equalized by a so-called $\sqrt{F}$ "equalizer". However, such an equalizer cannot compensate for reflections or echoes which are caused by discontinuities, such as wire gauge changes or bridged taps, in the transmission path. These echoes or reflections arrive at the end of the path later than the pulse which initiated them—possibly several bit periods later. As a result, for example, a digital zero following a digital "one" will not be truly zero because of the presence in its bit period of energy from the preceding pulse, and possibly earlier pulses. This and the attenuation of the main pulse, may make it difficult for the usual threshold or decision circuit to decide accurately whether a particular symbol should be a 1 or a 0. This phenomenon of intersymbol interference, generally known as "closing of the eye", is much worse in the loops because of the common occurrence of bridged taps—open-ended lines or stubs connected to the loop between its ends.

To reduce intersymbol interference an additional equalizer is provided at each receiver. Typically the additional equalizer includes a transversal filter through which the received signal is passed. Various proportions of the filter outputs are chosen to map the interference and are fed back as a correction signal for subtraction from the incoming signal.

The amplitude and timing of the echoes or reflections vary with each different transmission path or loop and it is preferable for the equalizer to be adaptable to compensate for the variations. This has led to the development of adaptive equalizers in which the coefficients which determine the feedback or correction signal are continuously adapted and optimized during transmission.

In aaking such adaptive equalizers for digital signals, problems are encountered due to "hunting" or fluctuations in the absence of intersymbol interference, limited precision due to D/A quantization, or random variation of coefficient values due to additive noise. Also they are not particularly immune to fixed offset and misalignment effects. Solution of these problems tends to increase complexity and cost.

As digital telephony has now developed to the stage that digital transmission in the ordinary two-wire subscriber loops is desirable, so considerable numbers of equalizers are involved; there is a need for an adaptive equalizer which not only mitigates aforementioned problems but is relatively simple, cheap to make, and rugged. The present invention aims to satisfy this need.

Summary of the Invention

According to one aspect of the present invention an adaptive equalizer for intersymbol interference in a digital communications system having decision means, for comparing a digital input signal, in each bit period, with a threshold level and providing an output having either a non-zero or a zero state in dependence upon whether or not said signal exceeds the threshold, comprises:

(a) input means, for summing a digital input signal and a feedback signal to provide a corrected digital signal for application to said decision means;

(b) means for detecting the occurrence in the corrected signal of a non-zero state in a first bit period and a zero state in a later bit period and on such occurrence providing an output signal indicative thereof;

(c) at least one feedback stage comprising:
  (i) correlator means responsive to said output of the decision means for sampling said corrected signal during said later bit period,
  (ii) integrator means for integrating said corrected signal samples to provide a control signal, and;
  (iii) feedback signal means responsive to said control signal for controlling said feedback signal so as to tend to reduce the actual corrected signal in said later bit period.

An advantage of integrating the corrected signal samples is that it avoids the need to measure the actual interference reater precision may be achieved as compared to known equalizers using purely digital techniques or digital analogue conversion with discrete quantization steps.

In preferred embodiments of the invention using bipolar input signals the input means provides not only the corrected digital signal, but also its inverse. Correlation between each of these signals and the appropriate detection means output advantageously results in virtual elimination of d.c. offsets and misalignment. It is then possible to use a very high gain in the feedback loop.

The equalizer may have a plurality of said feedback stages, each responding to a different one of a corresponding plurality of successive said later bit periods in which a zero state occurs and providing a corresponding feedback signal in that bit period.

According to a second aspect of the invention, a method of adaptively equalizing intersymbol interference in a digital communications system having decision means, for comparing a digital input signal, in each bit period, with a threshold level and providing an output having either a non-zero or a zero state in dependence upon whether or not said signal exceeds the threshold, comprises:

summing a digital input signal and a feedback signal to provide a corrected digital signal for application to said decision means; detecting the occurrence in the corrected signal of a non-zero state in a first bit period and a zero state in a later bit period and on such occurrence providing an output signal indicative thereof;

in response to said output signal sampling said corrected signal samples to provide a control signal, and;

in response to said control signal controlling said feedback signal so as to tend to reduce the actual corrected signal in said later bit period.

Brief Description of the Drawings

An embodiment of the invention will now be described, by way of example only, with reference to the accompanying drawings, in which.

Description of the Preferred Embodiment

Figure 1:
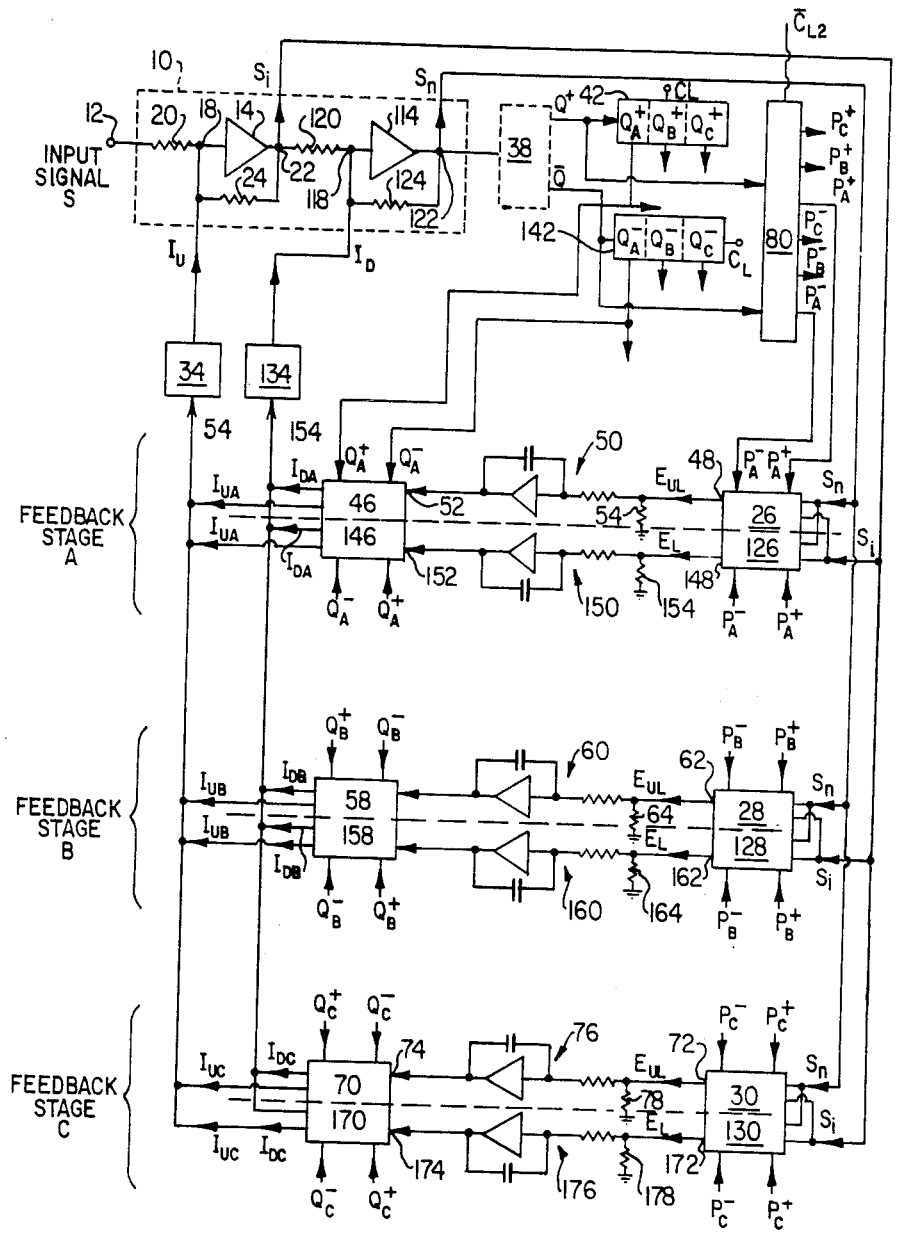
FIG. 1 is a general schematic representation of an adaptive equalizer for digital signals.

The adaptive equalizer shown in FIG. 1 is intended to equalize intersymbol interference for three successive bit periods following the original bit or digital pulse which generated the interference. Accordingly the equalizer has three substantially identical feedback loops or stages, each for a different bit period. Corresponding signals in the different stages are identified by the same reference letters but suffixed A, B and C, respectively.

Also, for reasons which will become apparent later, the equalizer uses the input signal inverted and non-inverted. It must also accommodate input signal pulses of opposite polarity and in each case the interference tail may have the same or opposite polarity as compared to the original pulse (see FIGS. 4(i) to 7(i)). Consequently each stage of the equalizer comprises two similar branches in parallel. To facilitate the description, therefore, identical components in different branches of a feedback stage generally are identified by reference numerals differing by 100.

Referring to FIG. 1, input means 10, for generating an inverted corrected signal $S_i$ and non-inverted corrected signal $S_n$ has an input 12 to which bipolar digital input signals S are applied from a transmission path such as a telephone subscriber loop. Typically the input signals will be applied by way of the usual $\sqrt{F}$ type of line equalizer (not shown).

The input means 10 comprises two summing and inverting amplifiers 14 and 114, respectively, connected in series. Amplifier 14, has its input 18 connected to the adaptive equalizer input 12 by a resistor 20, and its output 22 connected to the input 118 of amplifier 114 by a resistor 120. The amplifiers 14 and 114 have feedback resistors 24 and 124, respectively.

The outputs 122 and 22 of the summing means 114 and 14 carry, respectively, the corrected input signal $S_n$ and its inverse $S_i$ and are connected to corresponding inputs of each of three pairs of correlators, one pair in each of the three feedback stages, A, B and C of the equalizer.

Summing means output 122, alone, serves as the output from the equalizer and is also connected to a threshold or decision circuit 38, which provides positive pulses Q+ and negative pulses Q− depending upon whether or not the original pulses exceed the appropriate threshold which determines whether it is a '1' or '0'. The positive and negative outputs Q+ and Q− of the decision circuit 38 are connected to shift registers 42 and 142, respectively, which serve as digital delays. Each shift register provides three outputs $Q_A$, $Q_B$ and $Q_C$ with 1 bit period delay between each of them.

Figure 8:
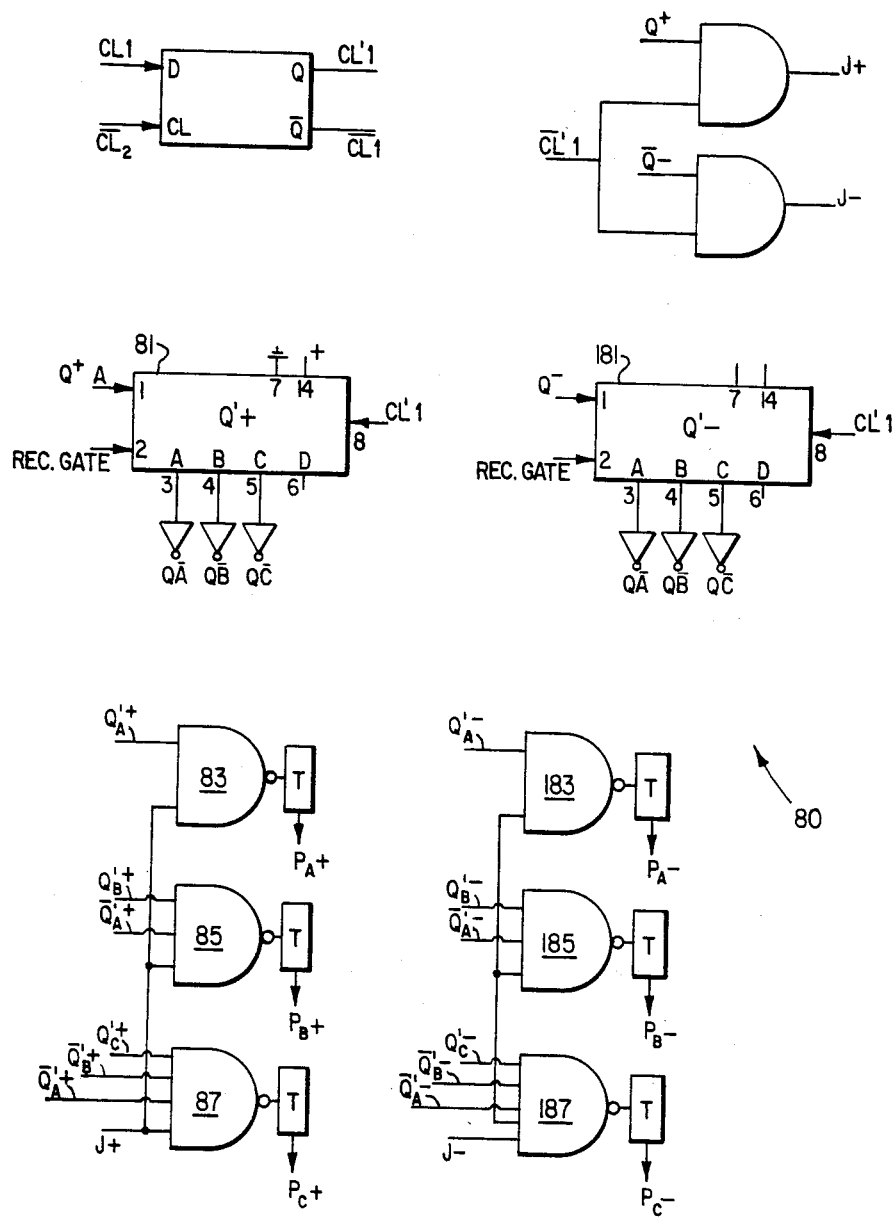
FIG. 8 shows in detail a detection circuit for detecting a prescribed sequence.
Figure 9:
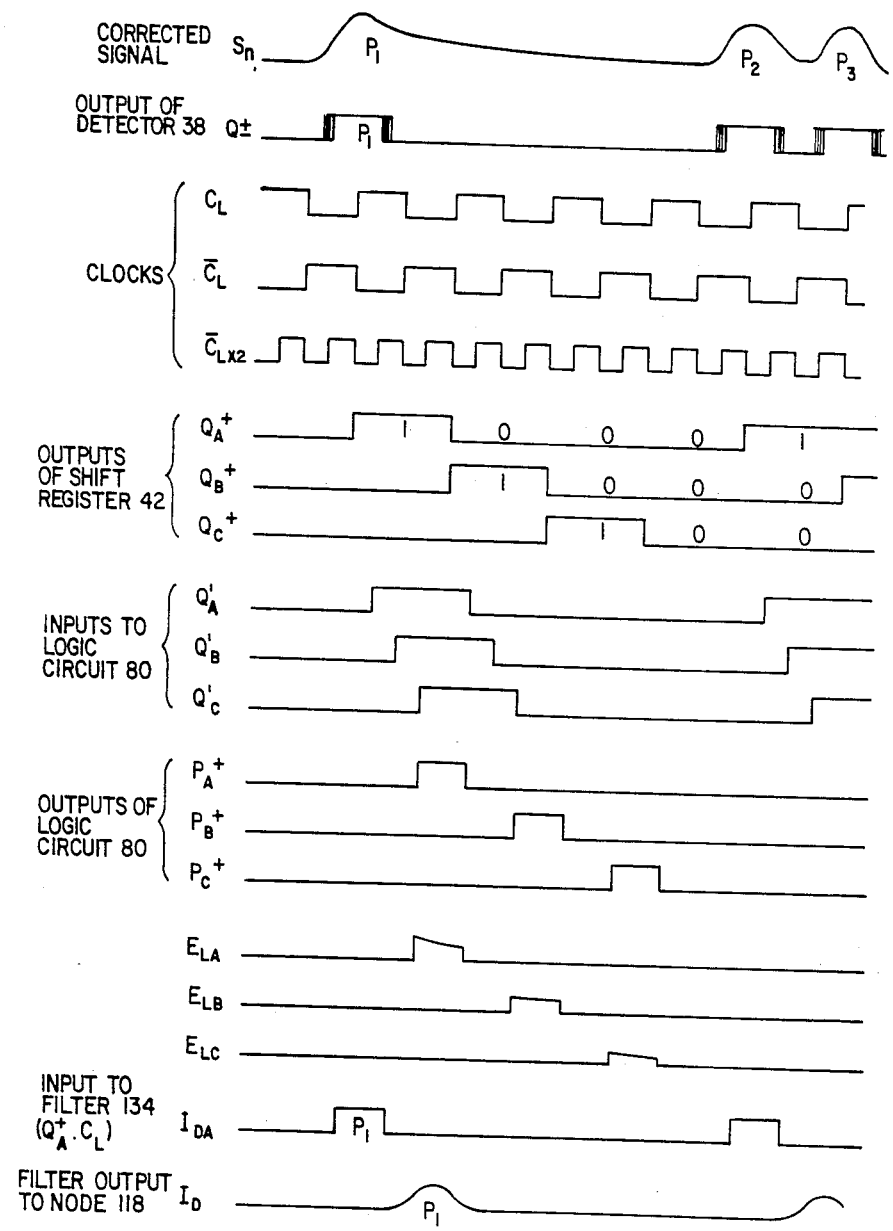
FIG. 9 is a timing diagram for the equalizer signals.

The Q+ and Q− outputs direct from the decision circuit 38 are also applied to a sequence detection means 80. The sequence detection means 80 comprises a pair of shift registers 81 and 181 (see FIG. 8) to which are applied signals Q+ and Q−, respectively, from the decision circuit 38. As shown in FIG. 8, the shift registers 81 and 181 are controlled by clock $C_L{}^1$ and each provides three outputs $Q_A{}^1$, $Q_B{}^1$, $Q_C{}^1$ corresponding to the outputs $Q_A$, $Q_B$ and $Q_C$ of shift registers 42 and 142, but delayed one quarter of a bit period.

The outputs $Q_A{}^{1+}$, $Q_B{}^{1+}$ and $Q_C{}^{1+}$, and their inverses, are applied in various combinations to a set of gates 83, 85 and 87, the outputs of which provide, via a drive transistor, gating signals $P_A{}^+$, $P_B{}^+$ and $P_C{}^+$ respectively. Outputs $Q_A{}^-$, $Q_B{}^{1-}$ and $Q_C{}^{1-}$ likewise are applied to gates 183, 185 and 187 which provide gating signals $P_A{}^-$, $P_B{}^-$ and $P_C{}^-$, respectively.

The sequence detection means 80 detects the occurrence in the input signal of the bit sequences 10, 100 and 1000, for either polarity, and provides corresponding outputs $P_A$, $P_B$ and $P_C$ of corresponding polarity, when they occur. Thus the logic array will effectively remove any code correlation in the signal before it is used to determine the amount of equalization. The coding form decorrelated by the illustrated array would be AMI bipolar coding, but it will be appreciated that other arrays could readily be devised for other codes.

Figure 2:
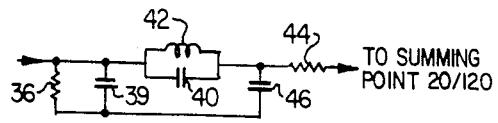
FIG. 2 shows a pulse-shaping network of the equalizer.

Referring again to FIG. 1, the gating signals $P_A{}^+$ and $P_A{}^-$ output from, sequence detection means 80 are both applied to both correlators 26 and 126, respectively; in respective parallel branches of the first feedback stage (A) of the equalizer. The correlators 26 and 126 have outputs 48 and 148, respectively, connected to integrators 50 and 150, respectively. The outputs of the integrators 50, 150 comprise control signals $V_{UL}$ and $V_L$, respectively. These control signals are applied to feedback signal means which comprises coefficient circuits 46 and 146 and pulse shaping circuits 34 and 134. The control signals $V_{UL}$ and $V_L$ are applied to inputs 52 and 152 of the coefficient circuits 46, 146, and to ground by way of resistors 54 and 154. Each of the coefficient circuits 46, 146 has inputs $Q_A{}^+$ and $Q_A{}^-$ from the shift registers 42 and 142, and two outputs, for feedback signal components $I_{UA}$ and $I_{DA}$, respectively, each output being connected to the appropriate one of two pulse-shaping networks 34 and 134. The output of pulse-shaping network 34 is connected to the input 18 of amplifier 14, which input serves as a summing point for the input signals and a feedback signal $I_U$ from the network 34. As shown in FIG. 2, the network 34 comprises a low-pass filter including a resistor 36 and capacitor 39 in parallel between its input and ground; a capacitor 40 and inductance 42, in parallel, connected in series with a resistor 44 between its input and output; and a capacitance 46 connected between ground and the junction of the resistor 44 and combination of capacitor 40 and inductance 42.

Referring again to FIG. 1, the input signal to the pulse-shaping network 34 is a current $I_U$ which is the sum of the outputs of the three equalizer stages (A, B and C) and has the form of square pulses having a duration of one half of a bit period. The network 34 gives the pulses a "bell" shape before their addition to the input signals at the summing point at the input 18 of amplifier 14. The pulses occur in the middle of the bit period. This reduces the possibility of detection errors and timing circuit variations. The current $I_U$, when input to the amplifier 14, causes a positive correction in the non-inverted signal $S_N$.

The input of amplifier 114 is connected, in similar manner, to pulse-shaping network 134 which shapes a second current which also constitutes the sum of outputs of the three equalizer stages. This second current is designated I and, when input to the summing point at the input 118 of amplifier 114, produces a negative correction in the non-inverted signal $S_N$.

The $P_B$ gating signals from sequence detections means 80 are connected in like manner to the second stage correlators 28 and 128. Shift register outputs $Q_B$ are connected to coefficient circuits 58, 158 in the same stage. Two integrators 60 and 160 connect the outputs 62 and 162, respectively, of the correlators 28 and 128 to the corresponding inputs of the coefficient circuits 58 and 158. Resistors 64 and 164 connect outputs 62 and 162 to ground. The two outputs of each of the coefficient circuits, 58 and 158 are connected to apply feedback current components $I_{UB}$ and $I_{DB}$ to the pulse shaping networks 34 and 134, together with the feedback signal components $I_{UC}$ and $I_{DC}$ from the third stage coefficient circuits 70 and 170.

The third gating signals $P_C+$ and $P_C-$ of the sequence detection means 80 are connected to third stage correlators 30, 130 and coefficient circuits 70, 170. The correlator outputs 72 and 172 are connected to coefficient circuit inputs 74 and 174 by integrators 76 and 176, respectively. Resistors 78 and 178 connect the outputs 72 and 172 to ground.

Figure 3:
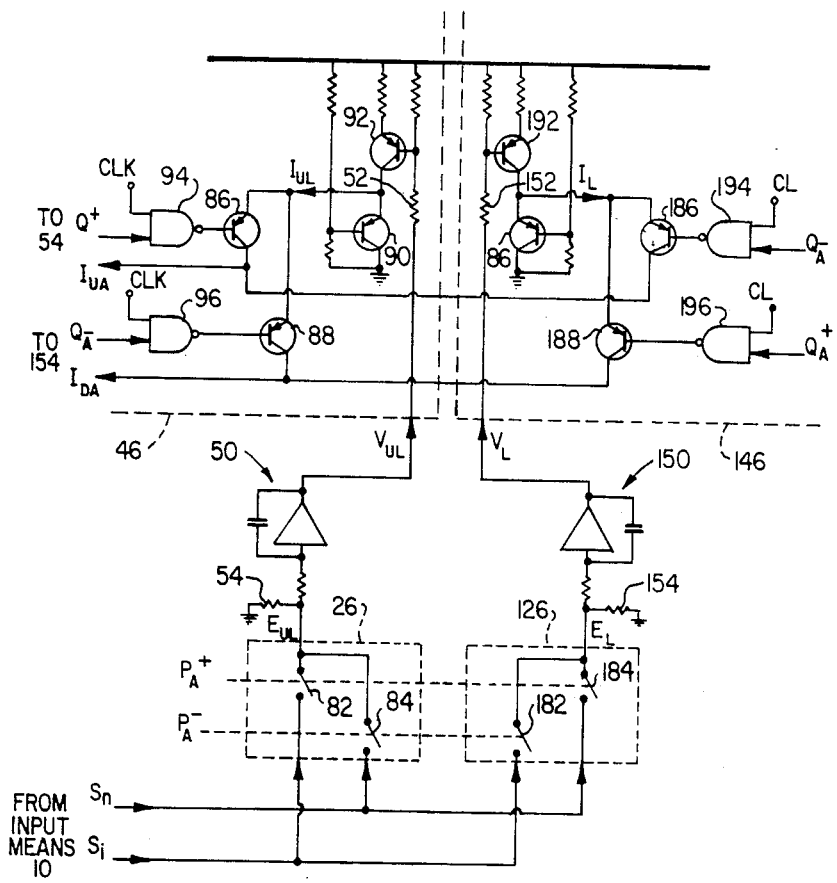
FIG. 3 shows a feedback stage (A) in more detail.

FIG. 3 shows feedback stage A in more detail. The other stages B and C are identical. The correlators 26, 126 comprise two pairs of analogue switches 82, 84 and 182, 184, controlled by the $P_A$ gating signal from the sequence detection means 80.

The delayed gating signal $P_A+$ controls switch 82, which applies a sample of inverse signal $S_I$ to integrator 50 as unlike error signal $E_{UL}$ and also controls switch 184, which applies non-inverted signal $S_N$ to integrator 150. The negative gating signal $P_A$ controls switch 182, which applies part of inverse signal $S_I$ to integrator 150, as like error signal $E_L$ and also controls switch 84, which applies non-inverted $S_N$ to integrator 50 as the "unlike" error signal $E_{UL}$.

In operation, an interference tail of the same polarity as the original pulse will give "like" correlation between the original pulse, as represented at the output of sequence detection means 80 by gating signal P+ or P-, and the sample of the corrected signal $S_N$, in the "zero" bit period. The latter, or its inverse, is applied to integrator 150, producing a corresponding decrease in its output, control signal $V_L$.

An interference tail of the opposite polarity to the original pulse will give "unlike" correlation between gating signals P+ and P- and $S_N$ to effect a corresponding decrease in its output, control signal $V_{UL}$.

FIG. 3 shows both coefficient circuits in 46 and 146 in more detail. Circuit 46 comprises three transistors 86, 88 and 90 connected with their emitters in common to the collector of a fourth transistor 92. The emitter of transistor 92 is connected to a supply rail and its base is connected by a resistor 52 to receive the output signal from integrator 50. Transistor 90 has its collector grounded and its base connected to a reference voltage supply. These transistors generate a unidirectional feedback current, the amplitude of which is controlled by the output signal, $V_{UL}$, of integrator 50.

Transistors 86 and 88 have their collectors connected to output lines 54 and 154, respectively, which convey currents $I_U$ and $I_D$ to the corresponding pulse-shaping networks 34 and 134. The bases of transistors 86 and 88 are connected to NAND gates 94 and 96, respectively. NAND gate 94 has one input connected to receive the delayed signal Q− from the negative shift register 42 and NAND gate 96 has one input connected to receive the delayed signal Q+ from the positive shift register 42. The second input of each of the gates 94 and 96 is connected to a clock source, conveniently derived from the outputs of the decision circuit 38 (FIG. 1) using a phase-locked oscillator (not shown).

The clock enables the gates 94 and 96 with a 50 percent duty cycle in the first half of a bit period. The shaping networks 34 and 134 (FIG. 1) delay the gated pulses of feedback current by a further quarter period so the "bell" pulses are applied to the summing points at amplifier inputs 18 and 118 in the middle of the later bit period as mentioned previously. The other coefficient circuit 146 is similar in construction, except that in this case Q+ and Q− are transposed so that Q+ controls application of $I_D$ to line 154 and Q− controls application of $I_U$ to line 54.

In operation, the control signal $V_{UL}$ from integrator 50 determines the amplitude of the current generated by transistors 90, 92. Gates 94 and 96 enabled by signals Q+ and Q−, respectively, select to which of shaping networks 34 and 134 it is diverted and hence to which of the summing points 18 and 118 it is applied. Operation of the other coefficient circuit 146 is similar, but Q+ and Q− are transposed so that "like" correlation between the interference and a positive original pulse will cause a feedback signal to be gated, as $I_D$, to network 134. Conversely, "like" correlation with a negative original pulse will cause the feedback signal to be applied, as $I_U$, to pulse-shaping network 34. The adaptive equalizer must contend with four basic types of input signal; positive and negative pulses, each with a positive or negative interference tail. These are illustrated in FIGS. 4 to 7 and the corresponding signals are set out in Table 1. For convenience, in each case only the first feedback stage is considered since operation of all three feedback stages is similar.

Consider, for example, an input signal as shown in FIG. 4(i), comprising a positive original pulse in a first bit period with a positive interference tail in the next, "zero", bit period, i.e. "like" correlation with a positive pulse. When applied to the decision circuit 38, such a signal will result in an output Q+ to the positive shift register 142, but no Q− output to the negative shift register 142. A corresponding gating signal pulse $P_A+$ will be generated by sequence detection means 80.

Accordingly, in the next (2nd) bit period, positive gating signal $P_A$ will close the corresponding switch 184 to apply non-inverted signal $S_N$ to integrator 150 in the first feedback stage. It should be noted from FIG. 5(ii) that gating signal $P_A+$ is clocked to have a duration of only one half bit period and delayed to occur in the middle of the second bit period.

Figure 4:
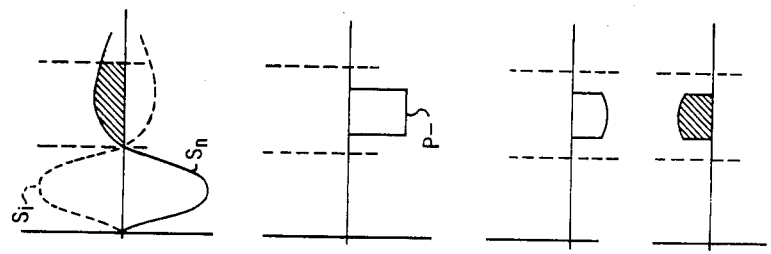
FIGS. 4 to 7 illustrate operation of the equalizer for positive and negative pulses and positive and negative interference tails.

Therefore, as shown in FIG. 4(iv), the corrected signal sample applied to the integrator 150 will be the interference tail portion of the non-inverted input signal $S_N$ occupying the middle of the second bit period.

As this signal is positive, the capacitor in integrator 150 will receive a small increment of charge, tending to drive the output control signal $V_L$ of the integrator 150 down.

Such decrease turns on transistor 192, (FIG. 3) increasing the amplitude of the current $I_L$. The presence of a $Q_A+$ input to only NAND gate 196 means that, when gate 196 is enabled by the clock, the current $I_L$ is gated to appear as a square pulse $I_{DA}$ on line 154 during the first half of the second bit period.

This current on line 154 is added to those from the second and third feedback stages of the equalizer (derived in a similar manner but due to original pulses in earlier bit periods) and applied by way of the shaping network 134 to the summing point at the input 118 to amplifier 114 as a "bell-shaped" pulse in the middle of the second bit period. The effect of increasing this current into the summing point 118 is to reduce the amplifier output $S_N$ and hence the interference component of the corrected signal in the second bit period.

Referring again to the correlators 26, 126; at the same time that $S_N$ is applied to integrator 150 gating, signal $P_A+$ also causes switch 82 in the other half 26 of the correlator to apply the inverted signal $S_I$ to integrator 50. Thus a negative signal sample is applied to integrator 50, causing its output $V_{UL}$ to increase. The effect of this increase is to inhibit transistor 92 in the corresponding half 46 of the coefficient circuit and thus reduce any current $I_{UL}$ from that half of the circuit. Such current, $I_{UL}$, will be gated by transistor 86, enabled by signal $Q_A+$, to network 34 and hence to summing point 18. Reducing the current into this summing point 18 will tend also to reduce the corrected signal interference in the second bit period.

Figure 5:
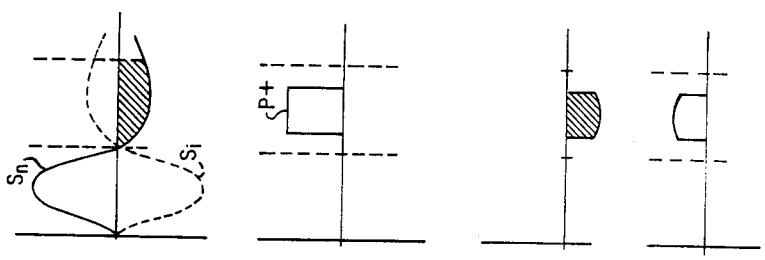
Figure 6:
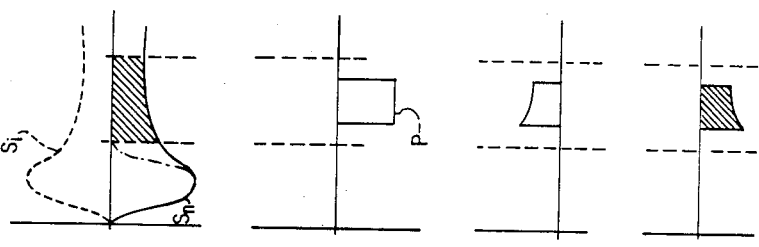
Figure 7:
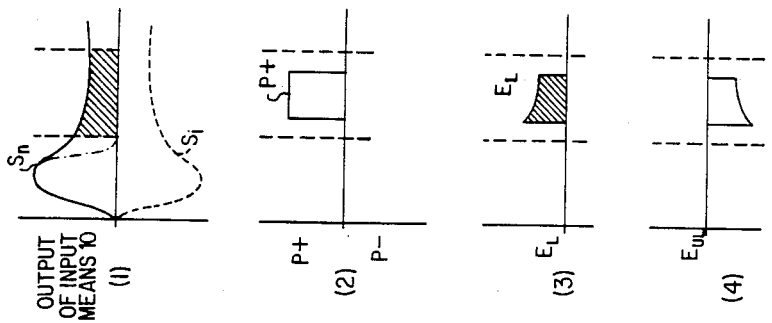

Operation with the other three combinations of original pulse and interference tail, as illustrated in FIGS. 5, 6 and 7, is analogous and can be determined by reference to Table 1.

It should be noted that the integrators 50, 150; 60, 160; and 76, 176 have a relatively high open loop gain, for example 70 dB, so over a large number of bit periods even a very small error signal can build up a high charge on the integrator capacitor. Consequently, the equalizer affords a high degree of precision and no significant overcorrection. It is not prone to "hunting" when the error or interference signal is close to zero. A further advantage is that the integrator substantially eliminates noise from the signal 9iving a high level of immunity.

It will be appreciated that improving the precision by employing high gain feedback circuitry will tend to exacerbate any problems of d.c. offsets or misalignment. A significant advantage of adaptive equalizers embodying the invention which operate on both the non-inverted signal and its inverse is that they will also reduce d.c. offset and misalignment errors. Thus, consider an input signal having a positive d.c. offset. When sampling a "zero" period after a positive pulse, the equalizer will treat the offset voltage as a positive interference error occurring after a positive original pulse, and increment the charge on the capacitor of "like" correlation integrator 150. When next a "zero" bit period is sampled after a negative pulse, the inverted signal S— will be applied to that integrator 150. However, the d.c. offset voltage is now inverted and so produces a corresponding decrement in the charge on the capacitor. Consequently, over a number of bit periods the d.c. offset voltage is eliminated.

It should be noted that integration over a large number of bit periods enables the equalizer to converge even when there is a high error rate or interference level. This is because the circuit utilizes the decision circuit or slicer output which, though only an approximation, will be correct on average.

An advantage of embodiments of the invention in which correlation is removed by detecting zero levels following a non-zero level, and sampling the signal directly during such "zero" interval to determine unwanted correlation, is that they obviate the need to measure the error signal directly.

For the specific application described, telephone subscriber loops, equalization over three bit periods has been found sufficient. However, for other applications a greater or lesser number of bit periods could be equalized, the number of feedback stages being adapted accordingly.

It should also be appreciated that the equalizer will operate with binary rather than bipolar signals, in which case corresponding halves of the various parts of the circuit could be omitted.

Although described specifically as applied to telephony, the invention comprehends adaptive equalizers for other digital communications systems which are susceptible to intersymbol interference.

Each of the coefficient circuits (46, 146; 58, 158; 70, 170) can be considered as a transconductance device which produces a digital output current (the feedback signal) the waveform of which corresponds to an input voltage waveform (the signal representative of the polarity of the non-zero state). The transconductance function then varies in dependence upon the control signal which is analogue. The need for such a transconductance device arises in apparatus other than adaptive equalizers. One particular application is to digital transversal filters, in which a digital signal is extracted from a delay line and applied to the transconductance device. The output of the transconductance device is then varied in dependence upon the control signal.

Accordingly, the invention further comprehends a transconductance device as aforementioned, and a transversal filter including such a device.

TABLE 1

| SIGNAL | | FIG. 4 | FIG. 5 | FIG. 6 | FIG. 7 |
|---|---|---|---|---|---|
| Original pulse $S_n$[1] | | + | — | + | — |
| Tail $T_n$[2] | | + | — | — | + |
| $Q_A$ | | + | — | + | — |
| $P_A$ | | + | — | + | — |
| | (P+. $T_N$)Tail | | | | |
| $E_L$ (150) | | + | + | — | — |
| | (P—. $T_I$)Tail | | | | |
| | (P+. $T_I$)Tail | | | | |
| $E_L$ (50) | | — | — | + | + |
| | (P—. $T_N$)Tail | | | | |
| $V_L$ | | Down | Down | Up | Up |
| $V_{UL}$ | | Up | Up | Down | Down |
| $I_L$ | | Up | Up | Down | Down |
| $I_{UL}$ | | Down | Down | Up | Up |
| | ($I_L$. Q+) | | | | |
| $I_D$ | | Up | Down | Down | Up |
| | ($I_{UL}$. Q—) | | | | |
| | ($I_{UL}$. Q+) | | | | |
| $I_U$ | | Down | Up | Up | Down |
| | ($I_L$. Q—) | | | | |
| $I_N$ Tail | | More Negative | More Positive | More Positive | More Negative |

What is claimed is:

1. An adaptive equalizer for a digital communications system having decision means, for comparing a digital signal, in a bit period, with a threshold level and providing an output having either a non-zero or a zero state in dependence upon whether or not said signal exceeds the threshold, said equalizer comprising:

(a) input means, for summing a digital input signal and a feedback signal to provide a corrected digital signal, said corrected digital signal being applied to said decision means;

(b) sequence detection means for detecting the occurrence in said corrected signal of a sequence comprising a non-zero state in a first bit period and at least one zero state in a later bit period and providing a gating signal for each such sequence;

(c) at least one feedback stage comprising: (i) correlator means responsive to said gating signal from said sequence detection means for sampling said corrected signal during a corresponding said later bit period; (ii) integrator means for integrating such corrected signal samples to provide a control signal, and (iii) feedback signal means responsive to said control signal for controlling said feedback signal so as to reduce the amplitude of said corrected signal during said later bit period.

2. An adaptive equalizer as defined in claim 1, wherein:
said input means is arranged to provide said corrected signal non-inverted and a signal that is substantially the inverse of said corrected signal;
each said gating signal from said sequence detection means corresponds to the polarity of said non-inverting signal in said first bit period; and
said correlator means is responsive to a said gating signal of one polarity to apply a sample of said non-inverted corrected signal to said integrator means and responsive to a said gating signal of the opposite polarity to apply a sample of said inverse signal to said integrator means.

3. An adaptive equalizer as defined in claim 2, wherein said feedback signal means comprises:
(iv) control means responsive to said integrator control signal for controlling the amplitude of said feedback signal and;
(v) gating means for controlling application of said feedback signal in said later bit period, said gating means being responsive to a signal representative of the polarity of said non-zero state in said first bit period for applying the feedback signal to said input means so as to effect opposite amplitude changes in said corrected signal in said later bit period in dependence upon said polarity of said non-zero state.

4. An adaptive equalizer as defined in claim 1, wherein said feedback stage comprises two substantially parallel branches, each comprising a said correlator means, a said integrator means and a said feedback signal means, and;
said correlator in the first branch is responsive to a said non-zero state of one polarity to apply said corrected signal sample to the corresponding first integrator, and said correlator in the other branch is responsive to a said non-zero state of the opposite polarity to apply said corrected signal sample to the corresponding second integrator;
said feedback signal means in said first branch is responsive to the corresponding first control signal and to a signal representative of the polarity of said non-zero state to apply to said input means selectively, first and second feedback signals when said non-zero state has, respectively, first and second polarities and;
said feedback signal means in the second branch is similarly but oppositely responsive to the other control signal and to said representative signal so as to provide selectively said first and second feedback signals when said non-zero state has, respectively, said second and first polarities.

5. An adaptive equalizer as defined in claim 4, wherein said input means comprises:

first and second summing and inverting means in series, said first summing and inverting means having its input connected to a first summing point, its output connected to a second summing point; and providing at its said output the inverse of said input signal; said second summing and inverting means having its input connected to said second summing point and providing at its output said corrected digital signal; and each said feedback signal means is arranged to apply said second feedback signal to said first summing point and said first feedback signal to said second summing point.

6. An adaptive equalizer as defined in claim 1, wherein said sequence detection means is arranged to provide a plurality of gating signals, each representative of a non-zero state in a first bit period followed by a zero state in a different one of a corresponding plurality of successive said later bit periods and said equalizer further comprises a corresponding plurality of said feedback stages, each such feedback stage being responsive to a respective one of said gating signals from said sequence detection means to control said feedback signal in a corresponding one of said later bit periods.

7. An adaptive equalizer as defined in claim 6, wherein said sequence detection means comprises delay means for delaying outputs of said decision means to occur in one or more later bit periods and a logic circuit responsive to the output of the decision means and the or each output of said delay means to determine the occurrence of said sequence.

8. An adaptive equalizer as defined in claim 1, wherein said feedback signal means is arranged to provide a substantially square pulse feedback signal in said later bit period and said equalizer further comprises:
means for converting said square pulse to a generally sinusoidal form.

9. An adaptive equalizer as defined in claim 1, wherein said feedback signal means is operative to apply said feedback signal to said input means during a middle part only of said later bit period.

10. An adaptive equalizer as defined in claim 9, wherein said middle part comprises substantially one half of said bit period.

11. An adaptive equalizer as defined in claim 1, wherein said correlator means comprises one or more switching means, each operative in response to a said gating signal from said sequence detection means to apply said signal sample to said integrator means.

12. A method of adaptively equalizing intersymbol interference in a digital communications system having decision means, for comparing a digital signal, in a bit period, with a threshold level and providing an output having either a non-zero or a zero state in dependence upon whether or not said signal exceeds the threshold, said method comprising:
summing a digital input signal and a feedback signal to provide a corrected digital signal, said corrected digital signal being applied to said decision means;
providing a gating signal indicative of the occurrence in said corrected signal of a sequence comprising a non-zero state in a first bit period and at least one zero state in later bit periods;
in response to said gating signal, sampling said corrected signal during said later bit period;
integrating such corrected signal samples to provide a control signal; and in response to said control signal controlling said feedback signal so as to reduce the amplitude of said corrected signal during said later bit period.

13. A method as defined in claim 12, including:
providing said corrected signal non-inverted and a signal that is substantially the inverse of said corrected signal;
providing said gating signal corresponding to the polarity of said non-inverted signal in said first bit period; and
in response to said gating signal of one polarity applying a sample of said non-inverted corrected signal for said integration and responsive to a said gating signal of the opposite polarity applying a sample of said inverse signal for said integration.

14. An adaptive equalizer as defined in claim 13, wherein the amplitude of said feedback signal is controlled in response to said control signal; and
application of said feedback signal in said later bit period is in response to a signal representative of the polarity of said non-zero state in said first bit period, the feedback signal being summed with the digital input signal so as to effect opposite amplitude changes in said corrected signal in said later bit period in dependence upon said polarity of said non-zero state.

15. An adaptive equalizer method as defined in claim 12 wherein said input signal is bipolar and in response to a said non-zero state of one polarity said corrected signal sample is integrated to provide a first said control signal and in response to a said non-zero state of the opposite polarity said corrected signal sample is integrated to provide a second said control signal; and in response to the first control signal and to a signal representative of the polarity of said non-zero state said input signal is summed, selectively, with first and second feedback signals when said non-zero state has, respectively, first and second polarities and in response to the second control signal and to said representative signal said input signal is summed, selectively, with said first and second feedback signals when said non-zero state has, respectively, said second and first polarities.

16. A method as defined in claim 12, wherein there is provided a plurality of said gating signals, each representative of a sequence comprising a non-zero state in a first bit period and a zero state in a different one of a corresponding plurality of successive said later bit periods, and said sampling and integrating steps are carried out in response to a respective one of said plurality of gating signals to control a corresponding said feedback signal in a corresponding one of said later bit periods.

17. A method as defined in claim 16, further comprising delaying outputs of said decision means to occur in one or more later bit periods and applying said outputs to a logic circuit to determine the occurrence of said sequence.

18. A method as defined in claim 12, wherein there is provided a substantially square pulse of feedback signal in said later bit period and said square pulse is then converted to a generally sinusoidal form.

19. A method as defined in claim 12, wherein said feedback signal is summed with said input signal during a middle part only of said later bit period.

20. A method as defined in claim 19, wherein said part comprises substantially one half of said bit period.

* * * * *